Patented Dec. 15, 1936

UNITED STATES PATENT OFFICE 2,064,571

MANUFACTURE OF STYROL

Omar H. Smith, West Englewood, N. J., assignor, by mesne assignments, to United States Rubber Company, New York, N. Y., a corporation of New Jersey No Drawing. Application September 14, 1934, Serial No. 744,008

6 Claims. (Cl. 202—57)

Styrol, $C_6H_5.CH:CH_2$, is an organic liquid which has been known for a long time. It has also been known that it can be polymerized to a solid thermoplastic, but this polymer as obtained by the ordinary polymerizing methods is brittle and of little commercial value. Recently polymerizing methods have been discovered by which the styrol can be polymerized to a tough thermoplastic which has electrical insulating properties of the highest value and other desirable properties rendering it a very useful commercial article.

The liquid styrol may be obtained by a number of methods, among which are the cracking of ethyl benzol or of halogenethyl benzol, or by treating halogenethyl benzol with an organic base such as pyridine. The solutions of crude styrol in ethyl benzol thus obtained are then subjected to purifying, including concentrating, steps, among which is fractionation. This fractionation is necessary in order to separate the styrol from impurities with a higher boiling point. The purifying steps are ordinarily carried out in iron or other ordinary metal apparatus. The styrol obtained from ethyl benzol, which contains no halogen, tends to polymerize under heat treatment or even at ordinary temperatures, and a number of inhibitors of such polymerization are known, among which are sulphur, quinone, and certain aromatic nitro compounds. However, when it is attempted to purify a styrol obtained by treating halogen-ethylbenzol with pyridine, and which therefore contains residual halogen, or to purify any other halogen-containing styrol, and using the usual metal apparatus, it is found that the usual inhibitors do not work, and as a result there is obtained an undesired premature polymerization of the styrol which produces a worthless product.

An object of my invention is to provide an improved and cheaper method of purifying styrol without premature polymerization.

Another object is to provide a method of purifying a halogen-containing styrol permitting the use of metal apparatus.

Still another object is to provide an improved inhibitor for preventing premature polymerization of styrol during purifying or other heat treatments.

Other objects will appear from the detailed description and claims.

The invention consists broadly in the heat purification, and specifically the fractional distillation, of a styrol in the presence of an aldehydeamine condensation product as an inhibitor of polymerization, and it further consists in such purification of a halogen-containing styrol in a usually employed metal apparatus.

As illustrative of the comparative efficiency of previously known inhibitors of polymerization and those of the present invention, the following examples are given. In each case equal amounts of styrol solution derived from chlorethyl benzol were used. The tests were carried out by heating a mixture of 100 parts styrol solution, two parts inhibitor and 12 parts of iron filings in a beaker on a hot plate. The first three examples show the inefficiency of previously used inhibitors, while the last two examples disclose the successful operation of the aldehyde-amine inhibitors of the present invention.

*Example 1.*—In this example the inhibitor used was sulphur, and the mixture foamed over almost immediately upon heating, leaving a residue of polymerized styrol.

*Example 2.*—In this example the inhibitor used was quinone, and the mixture reacted vigorously upon heating. The heating was continued until no more vapor was evolved. The bulk of the styrol remained in the beaker in the form of a thick viscous polymer.

*Example 3.*—In this example trinitrobenzol was used as the inhibitor, and the mixture foamed over almost immediately upon heating, leaving a residue of thick viscous polymer.

*Example 4.*—In this example the inhibitor used was the acetaldehyde-aniline condensation product obtained by reacting acetaldehyde and aniline in a strongly acid solution. The liquid boiled off rapidly at a uniform rate, and the residue contained no styrol polymer. Equally good results were obtained by using as inhibitor the acetaldehyde-aniline condensation product obtained by reacting acetaldehyde and aniline in basic solution.

*Example 5.*—In this case the inhibitor used was the heptaldehyde-aniline condensation product obtained by reacting heptaldehyde and aniline in a weakly acid or neutral solution. Upon heating the liquid boiled off rapidly at a uniform rate, and the residue contained no styrol polymer.

The following two examples illustrate the comparative results obtained on a factory scale by the use of a previously known inhibitor and one of the inhibitors of the present invention, respectively.

*Example 6.*—5 pounds of sulphur (one of the previously known inhibitors) were added to 476 pounds of a styrol-ethyl benzol mixture which was obtained in the usual manner from chlorethyl benzol. An attempt was made to fractionally distill this mixture in the usual iron equipment. The fractionation had scarcely been started when a vigorous reaction occurred which developed a dangerously high pressure and caused the styrol mixture to foam over into the receiver. When the reaction had subsided, both the still and the column were found to contain a dark viscous styrol polymer which had no commercial value.

Example 7.—9 pounds of acetaldehyde-aniline condensation product condensed in a strongly acid solution was added to 450 pounds of styrol-ethyl benzol mixture obtained in the usual manner from chlorethyl benzol. This mixture was fractionated in the usual iron equipment, and the fractionation was completed without the least difficulty and without premature formation of undesired polymer. This example was repeated many times without any trouble whatever, and a similar process is now in commercial use.

The acetaldehyde-aniline and heptaldehyde-aniline condensation products used in the above examples are merely illustrative of the type of compounds which have been used successfully, as either the aldehyde or the amine may be either aliphatic or aromatic, and as examples of others there may be mentioned butaldehyde-aniline, acetaldehyde-benzylamine, butaldehyde-ethylene diamine, butaldehyde-benzidine, anhydro-formaldehyde-aniline-butaldehyde, benzaldehyde-aniline, and butaldehyde-butylamine.

The inhibitors are also useful in preventing premature polymerization during heat treatment of styrols derived from alkyl benzols.

In the examples given the apparatus used was iron, but the invention also can be carried out by the use of various other commonly known metal apparatus.

It will be seen that by the invention a method has been devised by which the desirable method of treating a halogen-ethyl benzol to obtain the styrol can be employed, and at the same time the various purifying steps under heat can be carried out in the usual iron or other metal apparatus without formation of undesired polymer during the purifying operation.

It is not desired to limit the invention otherwise than as set forth in the appended claims.

Having thus described my invention, what I claim and desire to protect by Letters Patent is:

1. The method of fractionating without polymerization solutions of styrol containing chlorine as an impurity, which comprises fractionating such a solution in a metal apparatus in the presence of substantially 1 to 4 per cent. by weight of an aldehyde-amine condensation product.

2. The method of fractionating without polymerization solutions of styrol containing chlorine as an impurity, which comprises fractionating such a solution in a ferrous metal apparatus in the presence of substantially 2 per cent by weight of an aldehyde-amine condensation product.

3. The method of fractionating without polymerization solutions of styrol containing chlorine as an impurity, which comprises fractionating such a solution in a metal apparatus in the presence of substantially 1 to 4 per cent. by weight of an aliphatic aldehyde-amine condensation product.

4. The method of fractionating without polymerization solutions of styrol containing chlorine as an impurity, which comprises fractionating such a solution in a ferrous metal apparatus in the presence of substantially 1 to 4 per cent. by weight of an aliphatic aldehyde-aromatic amine condensation product.

5. The method of fractionating without polymerization solutions of styrol containing chlorine as an impurity, which comprises fractionating such a solution in a metal apparatus in the presence of substantially 1 to 4 per cent. by weight of an acetaldehyde-aniline condensation product.

6. The method of fractionating without polymerization solutions of styrol containing chlorine as an impurity, which comprises fractionating such a solution in a metal apparatus in the presence of substantially 1 to 4 per cent. by weight of a heptaldehyde-aniline condensation product.

OMAR H. SMITH.